United States Patent Office 3,465,524
Patented Sept. 9, 1969

3,465,524
FAN GAS TURBINE ENGINE
Geoffrey Light Wilde, Turnditch, and James Alexander Petrie, Derby, England, assignors to Rolls-Royce Limited, Derby, England, a British company
Continuation-in-part of application Ser. No. 533,649, Mar. 11, 1966. This application Jan. 3, 1968, Ser. No. 695,521
Claims priority, application Great Britain, Mar. 2, 1966, 9,056/66
Int. Cl. F02k 3/06, 1/12; F02c 3/06
U.S. Cl. 60—226                               6 Claims

ABSTRACT OF THE DISCLOSURE

A gas turbine ducted fan engine is provided with a fan having a single rotating stage only which is driven by a turbine having multiple rotating stages in order to maximise efficiency. The upstream side of the fan is unobstructed so that the noise produced by the fan is reduced.

---

Figure 1A:
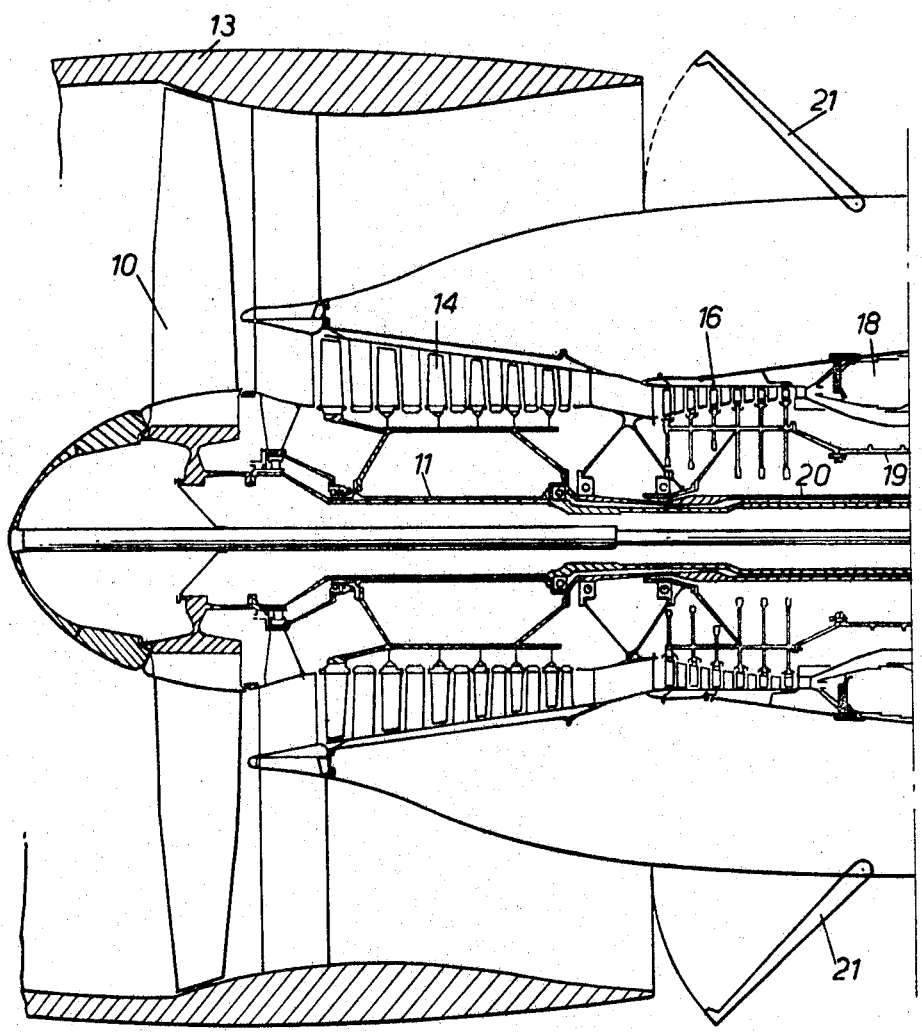
Figure 1B:
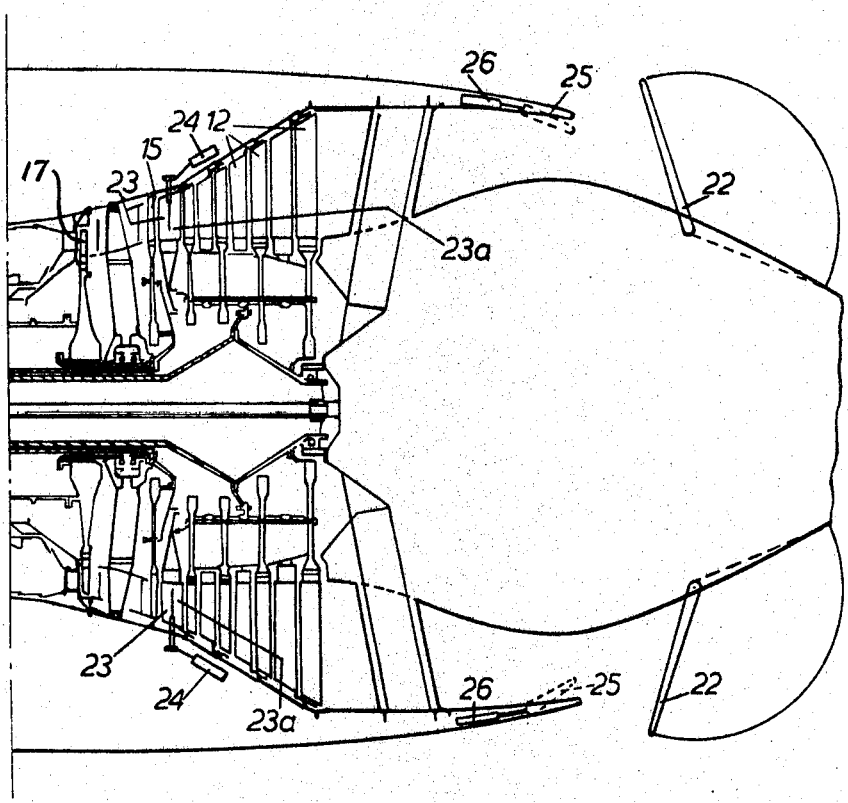

This invention, which relates to a turbo-fan engine, i.e. a gas turbine engine in which a fan is driven by a turbine, the turbine being supplied with gases from a gas generator, at least a proportion of the air compressed by the fan by-passing the gas generator and turbine, is a continuation-in-part of our co-pending application Ser. No. 533,649, now abandoned.

As is, in itself, well known, fan engines, by comparison with by-pass engines, have the advantage that the thrust of the engine is produced by means of a large volume of relatively slow moving air. Thus, since efficiency of a jet engine is at a maximum when the speed of the aircraft in which the engine is mounted is of the same order as the jet velocity, the aircraft does not need to attain such a high speed as would otherwise be necessary to obtain the maximum efficiency. For example, the jet velocity of a pure jet engine may be of the order of 800 miles per hour, whereas the aircraft may only be travelling at 500 miles per hour. The engine, in such a case, is therefore not operating at its most efficient condition. However, a fan engine may produce the same thrust, but with the jet velocity of only 500 miles per hour, in which case the engine will be working at its most efficient condition when the aircraft is travelling at the said 500 miles per hour.

In order to take advantage of the above facts, it is necessary to ensure that most of the work output of the engine is used in driving the fan, and thus it is necessary to ensure that the turbine driving the fan is a multiple stage turbine. Furthermore, a multiple stage turbine driving the fan is needed since it is necessary to keep the rotational speed of the fan relatively low in order to keep the fan tip speeds at an acceptable level for high efficiency. Since the diameter of the turbine is, of course, restricted by the size of the gas generator casing, a single stage turbine of that size cannot work efficiently at the low rotational speeds of which the fan is at its most efficient condition. Thus the multiple stage turbine is desired not only to extract as much work from the gas produced by the gas generator and transmit this to the fan but also to keep the rotational speed of the fan relatively low for high efficiency of the fan.

If the overall efficiency of the engine is to be maximised, it is necessary to have high compression of the air being supplied to the gas generator whose gases drive the fan. More than one stage of compression is therefore essential and if efficiency is to be maximised, and at the same time weight and complexity are to be reduced to a minimum, it is necessary that the intermediate pressure and high pressure compressors shall be allowed to rotate independently of each other, i.e. on separate shafts. At the present state of the art a single stage turbine can drive a compressor having a compression ratio of 4½:1 and such a compression ratio is about the maximum which can be achieved without resorting to variable stators etc., which would increase the weight and complexity of the system. Therefore, a single stage turbine connected to a 4½:1 ratio compressor makes a useful standard component. Using two such components, an overall ratio of 20:1 (approximately) may be achieved, such a ratio being desirable for the efficient running of the gas generator. Thus the use of single stage turbines driving two independent compressors gives the advantages that the compressor system is running at maximum efficiency without the complexity of variable geometry vanes, and that the minimum amount of work is extracted from the engine for driving the compressors, leaving the majority of work to be extracted for driving the fan.

To sum up, therefore, what has been stated so far, if the by-pass ratio of the engine is to be maximised, which it needs to be in the interest of efficiency, in practical terms this dictates that the fan shall be driven by a multiple stage turbine, while the necessary compression for the air supplying the gas generator driving the multiple stage turbine is achieved by the use of high and low pressure compressors which are respectively driven by single stage turbines.

A fan engine merely having the features which have been so far described would normally be excessively noisy. In order, therefore, to reduce this noise, the present invention provides that the fan should be a single stage fan and should be located in a fan duct which is unobstructed upstream of the single stage fan.

In a turbo-fan engine the total noise emitted can be traced to three major sources, namely the fan, the turbine and the jet exhaust.

The current trend is towards engines of relatively high by-pass ratio, for example in the range 2–6, and for such engines it would be ordinarily expected that, by comparison with engines of lower by-pass ratio, the jet and turbine noise would be decreased at the expense of increased fan noise. The noise from a fan having two or more stages in such an engine would be expected to reach a level comparable with the jet noise of early pure jet engines.

However, if a single fan without inlet guide vanes is aerodynamically suitable, and this is generally the case at a by-pass ratio in excess of 3, then there will be no such increase in fan noise, but a significant decrease to a level comparable with the turbine noise.

The mechanisms governing the noise generated by the fan blading are the aerodynamic interaction and reaction of blade wakes from the successive stationary and rotating stages. Inherently there are two distinctly different types of fan noise. Firstly, there are the discrete tones produced by the regular passage of the blades of the rotating stages through the wakes from the blades of the preceding stationary stage causing a series of tones and harmonics from each separate fan stage. Secondly, there is the randomly produced "white" background noise generated by the reaction of each blade of the rotating stages to the passage of air over its surface, even in a perfect stream-line flow airstream. Turbulence in the airstream passing over the blades merely serves to increase the intensity of the white noise.

Considering any one stage of a fan, the major noise-producing interaction occurs where the velocities are highest which, with fairly high by-pass ratios, is between the wakes from the blades of the preceding stationary stage and the leading edge of the following rotating stage. There is an interaction of a similar nature between the wakes from the blades of the rotating stage and the blades of the following stationary stage but this is of a lower intensity in current fan design due to lower velocities. If, therefore, the fan has only a single rotating stage and the inlet guide vanes are removed, then the major interaction between the blades of stationary and rotating stages is removed and only the self-induced "white noise" remains, together with the outlet guide vane interaction.

Struts or outlet guide vanes, of course, must be provided to support the fan duct, but, in the case of the present invention, these are provided downstream of the fan and such struts therefore contribute only to a minor extent to the noise produced by the fan as discussed above.

It is therefore an object of the invention to provide an engine in which the turbine driving the fan and the turbine means driving the compressors in the gas generator can be optimised in design to perform their particular limited functions with maximum efficiency.

A further object is to provide a gas turbine engine in which the maximum amount of work can be performed in the higher compressor stages of the compressor.

A yet further object of the invention is to provide an engine which is so built as to have an acceptable noise level.

According to the present invention there is provided a gas turbine engine having a fan duct, a high pressure ratio fan which is mounted in the fan duct and which has a single rotating stage only, the fan duct being un-obstructed upstream of the said single rotating stage, a first turbine having multiple rotating stages, first interconnecting means whereby the first turbine is drivingly interconnected with the fan, a gas generator which supplies the first turbine with gas, the gas generator being disposed downstream of the fan and comprising an intermediate pressure compressor, a high pressure compressor, combustion equipment, a single stage high pressure turbine and a single stage intermediate pressure turbine, all in flow series, and intermediate pressure and high pressure interconnection means whereby the compressors are drivingly interconnected to their respective turbines.

According to a feature of the invention the first turbine and single fan and the gas generator are coaxially arranged.

According to a feature of the invention the gas turbine engine is provided with variable nozzle guide vanes.

According to yet a further feature of the invention a gas turbine engine is provided with a variable area final nozzle.

A further feature of the invention is that the fan is located in a short duct extending less than half the length of the engine.

Finally, according to an additional feature of the invention, struts extend across the said duct behind the fan for providing the sole support for the said duct.

As will be appreciated, there are no inlet guide vanes or struts in front of the high pressure ratio fan, and this has the effect of reducing the noise which would otherwise be created by the fan.

In the accompanying drawing, there is shown a three shaft gas turbine engine embodying the invention. The engine comprises a single stage high pressure ratio front fan 10 carried by a fan shaft 11 driven by a multiple stage turbine 12. The fan is located in a short duct 13 at the front of the engine, the duct 13 extending less than half the length of the engine. The multi-stage turbine 12 is driven by gases produced by a gas generator comprising an intermediate multi-stage compressor 14 driven by its own single stage turbine 15 and a high pressure multi-stage compressor 16 driven by its own turbine 17. The gas generator has its own combustion system 18 and it will be noted that the high pressure compressor 16 and the turbine 17 are located on a shaft 19 coaxially arranged with a shaft 20 carrying the intermediate compressor 14 and turbine 15. These two shafts are coaxial with the fan shaft 11.

The engine is equipped with thrust reversers for the fan air and also for the exhaust from the gas generator. The thrust reversers are shown respectively at 21 and 22 and are the subject of the co-pending application Ser. No. 610,885 filed Jan. 23, 1967.

This engine arrangement enables the maximum amount of work to be achieved in the later stages of the compressor and since each of the compressors and the fan is driven by its own turbine all the turbine stages and compressors can be optimised in design for the particular function they are to perform.

If necessary the engine can be adapted for different duties by using variable geometry such as variable nozzle guide vanes and variable final nozzle area. Thus the variable geometry features may be particularly useful in enabling the fan turbine and the fan to be slowed down so as to reduce noise production under conditions where additional noise reduction is advantageous.

Typical variable guide vanes 23 may be included in the engine structure, and the guide vanes 23 can be adjusted in a well-known manner, such as by actuators 24 which are shown diagrammatically. The actuators 24 are connected to hinged trailing edge portions 23a of each nozzle guide vane 23, and each guide vane 23 has a fixed leading edge portion, as is well known in this art. Alternatively, or in addition, a variable area final propulsion nozzle 25 may be provided, the nozzle area being adjusted by means of actuators 26, which are also shown diagrammatically.

We claim:
1. A silenced, by-pass gas turbine engine having a by-pass ratio of at least three, comprising of fan duct, a high pressure ratio fan which is mounted in the fan duct and which has a single rotating stage only, the fan duct being un-obstructed upstream of the said single rotating stage to reduce fan noise, a first turbine having multiple rotating stages, first interconnecting means drivingly interconnecting said first turbine with the fan whereby work output is maximized from the first turbine to the fan and whereby the fan is driven at relatively low rotational speeds, a gas generator which supplies the first turbine with gas, the gas generator being disposed downstream of the fan and comprising an intermediate pressure compressor, a high pressure compressor, combustion equipment, a single stage high pressure turbine and a single stage intermediate pressure turbine to maximize the efficiency of the gas generator, all in flow series, and intermediate pressure and high pressure interconnection means whereby the compressors are drivingly interconnected to their respective turbines.

2. A gas turbine engine according to claim 1 in which the first turbine and single stage fan and the gas generator are coaxially arranged.

3. A gas turbine engine according to claim 1 which includes variable nozzle guide vanes located downstream of said combustion equipment.

4. A gas turbine engine according to claim 1 which has a variable area final nozzle.

5. A gas turbine engine according to claim 1 in which the fan is located in the short duct extending less than half the length of the engine.

6. A gas turbine engine according to claim 1 in which struct extend across said duct behind the fan for providing the sole support for the said duct.

References Cited

UNITED STATES PATENTS

| | | | |
|---|---|---|---|
| 3,252,282 | 5/1966 | Grieb | 60—39.16 |
| 3,269,114 | 8/1966 | Marchant | 60—226 |
| 3,273,340 | 9/1966 | Hull | 60—39.16 |
| 3,279,181 | 10/1966 | Beavers | 60—226 |
| 3,280,561 | 10/1966 | Kutney | 60—226 |

FOREIGN PATENTS

| | | |
|---|---|---|
| 270,342 | 11/1950 | Switzerland. |
| 588,096 | 5/1947 | Great Britain. |

CARLTON R. CROYLE, Primary Examiner

DOUGLAS HART, Assistant Examiner

U.S. Cl. X.R.

60—39.16